(12) United States Patent
Berenberg (10) Patent No.: US 10,074,227 B1
(45) Date of Patent: Sep. 11, 2018

(54) SECURED LOCATION CONFIRMATION

(71) Applicant: Amazon Technologies, Inc., Seattle, WA (US)

(72) Inventor: Paul Berenberg, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/673,158

(22) Filed: Aug. 9, 2017

(51) Int. Cl.
*G07C 9/00* (2006.01)
*H04N 7/18* (2006.01)
*G06Q 10/08* (2012.01)

(52) U.S. Cl.
CPC ... *G07C 9/00103* (2013.01); *G06Q 10/08355* (2013.01); *G07C 9/00182* (2013.01); *G07C 9/00904* (2013.01); *H04N 7/188* (2013.01); *G07C 2209/08* (2013.01)

(58) Field of Classification Search
CPC ............ G07C 9/00103; G07C 9/00182; G07C 9/00904; G07C 2209/08; G06Q 10/08355; H04N 7/188; A61B 5/11; A63B 24/0062; A63B 69/36; A63B 69/38
USPC .......................................... 340/5.71; 434/247
See application file for complete search history.

(56) References Cited

U.S. PATENT DOCUMENTS 9,849,364 B2 * 12/2017 Tran ...................... A63B 69/36

* cited by examiner

*Primary Examiner* — Ali Neyzari
(74) *Attorney, Agent, or Firm* — Knobbe Martens Olson & Bear LLP (57) ABSTRACT

Features are disclosed for accurately and efficiently identifying whether a location is secured after unattended delivery of an item. The features include receiving, from an access control device, information identifying a secured state for the access control device. The features include capturing, via a monitoring device at the physical location, monitoring data of the physical location such as one or more images. The features include determining that the monitoring data includes a representation of at least a portion of a surface indicium such as a one-dimensional barcode. Features are described for transmitting, to at least one communication device, a message identifying an error state for the physical location such as an alert that the physical location may be unsecured.

20 Claims, 6 Drawing Sheets

SECURED LOCATION CONFIRMATION

BACKGROUND

Item deliveries may require the presence of a person to receive the item. If no one is available to receive the item, subsequent attempts may be made to deliver the item. In some instances, a remote access authentication and authorization system may be provided to grant unattended access to a delivery agent to the delivery location. Such systems may not identify failures which may leave a location unsecured.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

When delivering an item to an unattended location, granting access to the delivery location is one aspect of a secure and auditable solution. Another aspect of such solutions includes ensuring the delivery location is secured upon completion of the unattended delivery.

Described are features to provide remote access for an unattended delivery with secure authentication and authorization. The solution ensures delivery integrity by verifying, in real-time, that an entry (e.g., door, lid, drawer, cabinet) to the delivery location has been returned to a secured state. In some instances, the system may engage a lock or other security mechanism for the entry. The lock may engage even if the entry is not closed. For example, the lock may extend from the door and prevent the door from completely closing. In such instances, the system may determine based on the state of the lock being engaged, that the location is secure. However, the door may still be accessible because the lock did not secure the door.

One solution to detect such security failures may be to include additional hardware to detect engagement of the lock within a receptacle such as a strike plate. However, this solution may require installation of specialized hardware and coordination of additional messages to determine whether the location is secured. These and similar solutions for door sensing can involve specialized hardware such as magnetic or touch wireless sensors. Such solutions have limitations such as: significant cost, non-trivial installation, limitations related to specific door and door jamb shape, reliability concerns due to mechanical wear and tear, ongoing maintenance needs such as battery changes, security and/or reliability degradation due to RF interference, and in some instances aesthetic issues with the physical elements needed to provide accurate and secure detection.

Another solution described in further detail herein is to include a surface indicium or multiple surface indicia on a portion of the entry. A surface indicium may include one or more detectable features applied to a surface of the entry at the delivery location that can be sensed by a monitoring device such as a camera or other optical scanning or image capturing device. The surface indicium may be visible when the entry is unsecured (e.g., door is open, delivery bin lid is raised, delivery locker door is opened, etc.). If the surface indicium is detected in monitoring data (e.g., an image) captured by a monitoring device, the entry may be deemed unsecured. One example of a surface indicium is a one-dimensional barcode. It may be desirable to use a one-dimensional indicium to ensure detection of the indicium from an image captured at an arbitrary angle. Other examples of one-dimensional indicium include a piano keyboard pattern, a ruler pattern, a ladder pattern, or other markings with consistent visual detectability from arbitrary angles. The indicium may be printed and affixed to the entry such as to a portion of the door frame that faces the strike plate. In some implementations, the indicium may be painted or drawn onto the portion of the door frame using ink that is visible in plain light or visible only when illuminated by a specific wavelength of light.

In an embodiment of the features described, a recipient may attach an adhesive door-width wide one-dimensional barcode to the edge of a door and a camera that is part of the unattended delivery system may detect the barcode when the door is open. The system may initiate detection of the surface indicium during unattended delivery and transmit alerts if the location is left unsecured.

Figure 1:
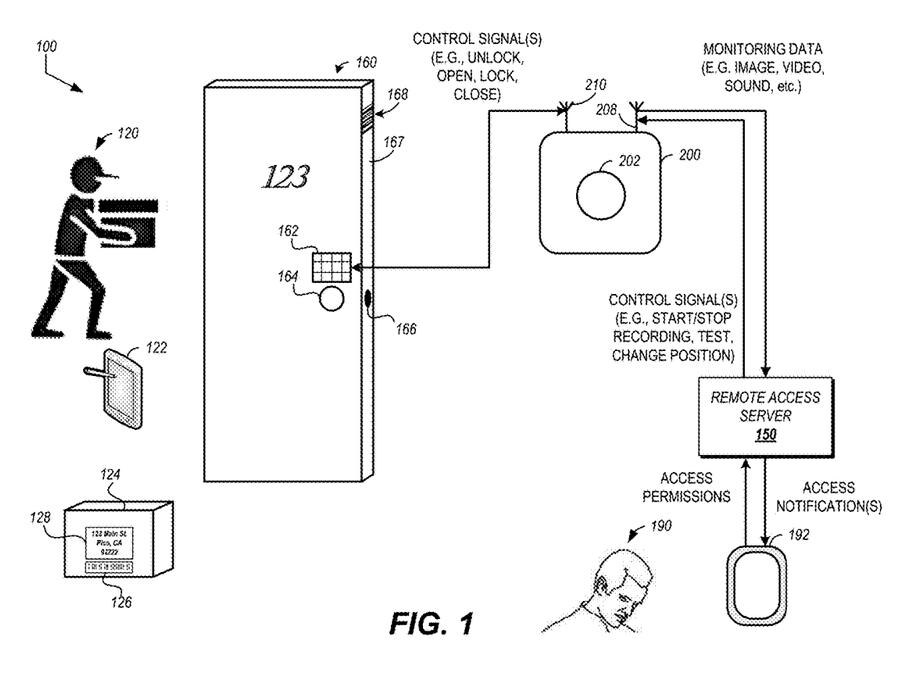
FIG. 1 is a block diagram showing an example environment including a remote access system to confirm security of a location.

FIG. 1 is a block diagram showing an example environment including a remote access system to confirm security of a location. The environment 100 may include a delivery device 122. The delivery device 122 may be an electronic communication device configured to transmit machine readable messages via multiple wireless communication protocols. Non-limiting examples of the delivery device 122 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic device or appliance. The messages may be formatted according to a standardized protocol such as TCP/IP, HTTP, FTP, or the like. The transmission may be sent via wireless or hybrid wired-wireless networks.

A delivery agent 120 may interact with one or more interfaces presented via the delivery device 122. The interfaces may include control elements to receive input or adjust a function of the delivery device 122. For example, the delivery device 122 may include a camera or other optical scanning element. The delivery device 122 may activate the camera to scan an item 124 to be delivered. The item 124 may include a label 128 identifying a recipient 190 of the item 124 or a delivery location associated therewith. The item 124 may include a scannable code 126.

In some implementations, the scannable code 126 may be a machine-readable code, e.g., optical code, one dimensional (1D) bar code, two dimensional (2D) bar code, recognizable text characters, or an image. In the case of a 2D bar code (also referred to as a "matrix code"), the scannable code 126 may be a QR® or "quick response" code, an EZCode® bar code, a PDF417 or "portable data file" bar code, a high capacity color bar code, etc. The scannable code 126 may be scanned using optical techniques such as image scanning or infrared scanning. The scannable code may be transmitted using wireless techniques such as near field communication, radio frequency identification tags, BLUETOOTH®, or other standardized or proprietary wireless messaging technology. The scannable code 126 may be affixed or otherwise associated with the item such that the item can be tracked from the supplier, transportation, fulfillment center, and ultimate end user. The scannable code 126 may encode or indicate an identifier for the item or delivery information related to the item such as address or other information used in identifying or delivering the item 124.

The monitoring device 200 may be implemented as a camera or other data collection device. The monitoring device 200 may be placed to monitor a delivery location. In some implementations, the monitoring device 200 may be placed near a door 160. The monitoring device 200 may be placed behind the door 160 or in an area in front of the door 160. The monitoring device 200 preferably collects data to identify entry and exit activity at the delivery location.

The door 160 may include a handle 164. The handle 164 may be manually operated to disengage a locking mechanism 166. Upon disengagement of the locking mechanism 166, the door 160 may open. In some implementations, the door 160 may be an automated door that, upon unlocking, opens using a mechanical opening system. The door 160 may include a keyless lock controller 162 (e.g., a smart lock). The keyless lock controller 162 may be an electronic device that can send and receive wireless signals such as via ZIGBEE™, Z-WAVE®, or other local area network protocols. The keyless lock controller 162 may receive lock or unlock command messages. These messages may cause the keyless lock controller 162 to engage or disengage the locking mechanism 166 without using the handle 164. In some implementations, the keyless lock controller 162 may include a key pad or other input element to receive an entry code to control the locking mechanism 166.

The keyless lock controller 162 may receive control signals from the monitoring device 200. The monitoring device 200 may include a first wireless transceiver 210 for communications via local area network protocols. The monitoring device 200 may include a second wireless transceiver 208 for communications via a wide area network (e.g., the Internet or a cellular network) either directly or via a router (not shown). The first wireless transceiver 210 and the second wireless transceiver 208 may be commonly implemented in a multiband transceiver selectively configured to communicate via different wireless protocols. The monitoring device 200 may also transmit wireless signals using a personal area network protocol such as a BLUETOOTH® Low Energy 4.0 standard based protocol. These signals may be broadcasted to a predetermined area such as near the door 160.

A surface 167 of the door 160, such as the surface including the locking mechanism 166, may include a surface indicium 168. As shown in FIG. 1, the surface indicium 168 is implemented as a one dimensional barcode. The surface indicium 168 may be a one-time use mark. For example, the recipient 190 may receive a message via an access device 192 indicating that a delivery attempt will be made on a specific day. This message may also include a printable indicium that the recipient 190 can print and affix to her door 160 to confirm that the delivery location is secured after unattended delivery of the item 124. In some implementations, the surface indicium 168 may encode a custom message. For example, the recipient 190 may provide a series of alphanumeric characters via a user interface presented on the access device 192. The characters may be transmitted to the remote access server 150 and stored in association with an identifier for the recipient 190. The indicium 168 may then be printed or otherwise transferred to the door 160 for detection by the monitoring device 200.

The monitoring device 200 may transmit monitoring data such as image data, video data, audio data, or the like collected by a sensor 202 the monitoring device 200. In some implementations, the monitoring device 200 may include an illuminator that can emit different wavelengths of light. The illuminator may be activated to emit different wavelengths to capture a series of images under different illumination conditions. This can allow the user different surface indicium such as to monitor the security for different entries or different delivery agents. The monitoring data collected by the monitoring device 200 may be transmitted via the second wireless transceiver 208, via the wide area network, to the remote access server 150. The remote access server 150 may store the monitoring data in a data store.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The remote access server 150 may transmit control messages to the monitoring device 200. For example, the remote access server 150 may transmit a message causing the monitoring device 200 to begin collecting monitoring data. In some implementations, the monitoring device 200 may transmit one or more acknowledgement messages to the remote access server 150 indicating a response to or result of a control message. In some implementations, the acknowledgement may be included in a message with monitoring data.

The remote access server 150 may transmit access notification messages to the access device 192 associated with the recipient 190. The access device 192 may be an electronic communication device configured to transmit and receive machine readable messages such as email, text messages, messages to activate an application or function of the access device 192, or delivery alerts as described herein. Non-limiting examples of the access device 192 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, or the like. The transmission may be sent wired, wireless, or hybrid wired-wireless networks.

Figure 2A:
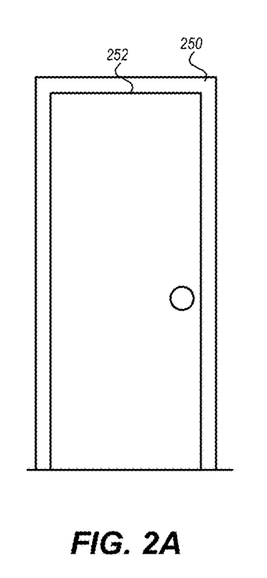
FIG. 2A is a diagram showing a door in a secure position.

FIG. 2A is a diagram showing a door in a secure position. A door 252 may be secured when the door 252 is seated within a door jamb 250. In this position, any locking or securing mechanisms may engage with the door 252. The view shown in FIG. 2A may be captured in an image by the monitoring device 200.

Figure 2B:
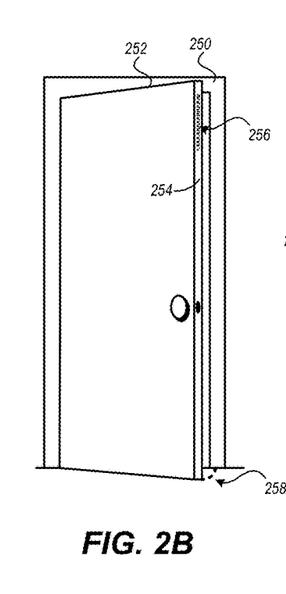
FIG. 2B is a diagram showing a door with a surface indicium in an unsecured position.

FIG. 2B is a diagram showing a door with a surface indicium in an unsecured position. In FIG. 2B, the door 252 has been opened a distance 258 from the door jamb 250. This movement may expose a surface 254 of the door 252 that was otherwise hidden from view when the door 252 was in a secured position (e.g., as shown in FIG. 2A). The surface 254 may have a surface indicium 256 disposed thereon. The view shown in FIG. 2B may be captured in an image by the monitoring device 200. The image may be analyzed for the presence of the surface indicium 256 and, if determined to be present in the image, the location may be determined to be unsecured.

Figure 2C:
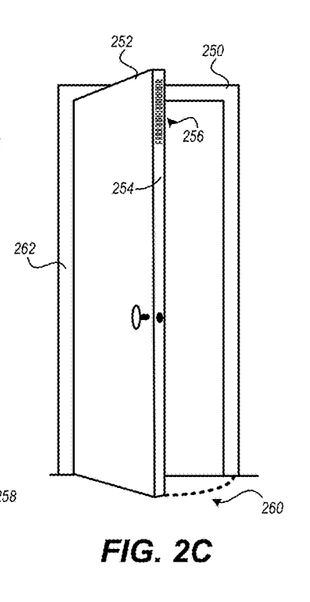
FIG. 2C is a diagram showing a door with a surface indicium in another unsecured position.

FIG. 2C is a diagram showing a door with a surface indicium in another unsecured position. In FIG. 2C, the door 252 has been opened a distance 260 from the door jamb 250. The distance 260 may be greater than the distance 258 shown in FIG. 2B. This movement may expose a greater portion of the surface 254 of the door 252 than shown in FIG. 2B. The surface 254 may present more of the surface indicium 256 disposed thereon. The view shown in FIG. 2C may be captured in an image by the monitoring device 200. The image may be analyzed for the presence of the surface indicium 256 and, if determined to be present in the image, the location may be determined to be unsecured.

In some implementations, the surface indicium 256 may encode a value that can be used to contact the recipient or other party in the event the delivery location is determined to be unsecured. For example, the barcode shown in FIG. 2B or FIG. 2C may encode a telephone number ("555-123-1234") that can be used to contact the recipient 190, the delivery agent 120, or other entity (e.g., security service provider, local police, etc.) if the location is unsecured. In some implementations, the surface indicium 256 may encode an email address, device identifier, account number, short message code, or other information for contacting the recipient 190 or other identified party. The surface indicium 256 may be provided with standardized dimensions such as 24 inches by the width of the door (e.g., 1 inch, or 0.75 inches). The dimensions may vary based on the distance between the door and the monitoring device. A surface indicium having a length of 24 inches and a width that does not exceed the width of the door or entry upon which the surface indicium is affixed may be used in implementations where the monitoring device 200 is approximately 10 feet from the door 252 and situated to capture images of the surface 254 of the door 252 when the door 252 is moved away from the door jamb 250. For example, the monitoring device 200 may not have a field of view to capture images of surface 254 or the surface indicium 256 if situated on a hinge side (e.g., side 262 of FIG. 2C) of the door 252.

Figure 2D:
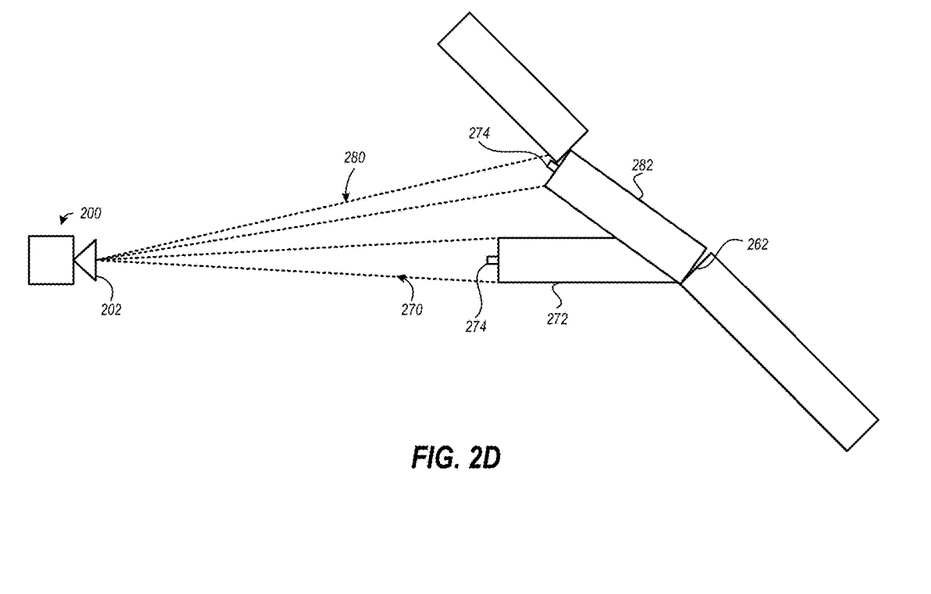
FIG. 2D is a diagram showing an overhead perspective a door with a surface indicium when the door is in unsecured positions.

FIG. 2D is a diagram showing an overhead perspective a door with a surface indicium when the door is in unsecured positions. An extended lock 274 is shown in FIG. 2D. The extended lock 274 may be reporting its state as secured, but, as shown in FIG. 2D, the delivery location is not secured. A first door position illustrates the door in a fully opened position 272. The fully opened position 272 may correspond to the position where the entry cannot be opened any further, limited by, for example, a hinge on the side 262. In the fully opened position 272, the sensor 202 of the monitoring device 200 is provided a first field of detection 270. which allows detection of the surface of the door including the extended lock 274. The amount of the surface detected when the door is in the fully opened position 272 is greater than an amount of the surface that is detected when the door is in a second minimally opened position 282. A second field of detection 274 of the sensor 202 may detect only a portion of the surface of the door. In the minimally opened position 282, the portion of the surface detected by the sensor 202 is less than that which can be detected in the fully opened position 272.

It will also be appreciated that the angle of detection differs between the first field of detection 272 and the second fields of detection 274. As discussed, the surface indicium which is being detected may be one-dimensional such that the difference in detection angles does not impact the ability to detect the surface indicium. In some implementations, the position of the sensor 202 in relation to the surface upon which the surface indicium will be placed may be used to determine the dimensions of the surface indicium. A sensing capability of the monitoring device, such as image resolution, may be used to determine the dimensions of the surface indicium. For example, a 1080p camera may be configured to capture images at a resolution of 1920×1080 pixels. If the door height is 2032 mm and the sensor 202 is mounted to capture an image showing the full height of the door, the minimum size for the surface indicium may be 1.9 mm (e.g., door height divided by vertical pixel resolution). To ensure detection of the surface indicium by such a camera, the size of the thinnest barcode line should not be smaller than the minimum size.

Figure 3:
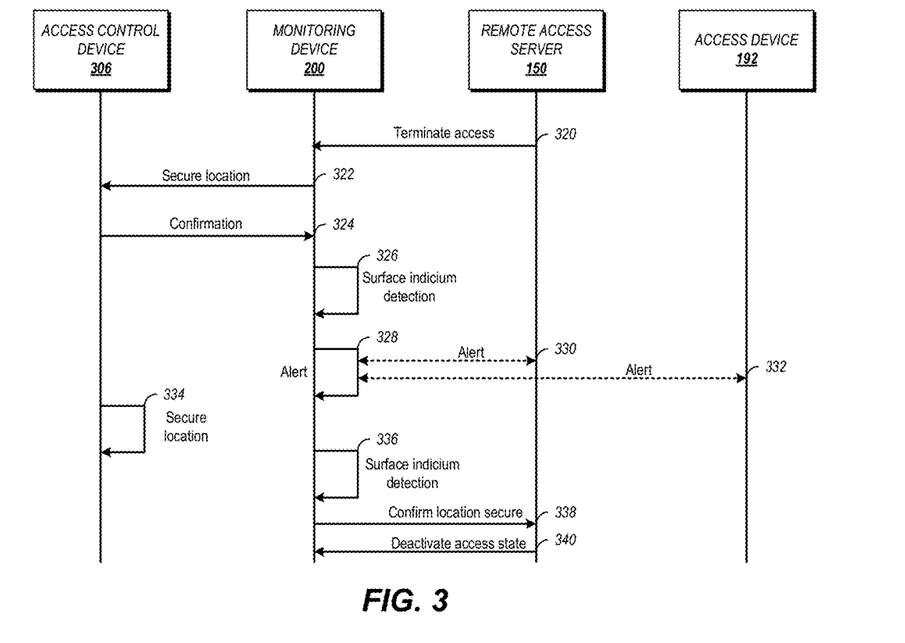
FIG. 3 is a diagram showing illustrative messaging between devices within a remote access system for confirming that a delivery location is secured.

FIG. 3 is a diagram showing illustrative messaging between devices within a remote access system for confirming that a delivery location is secured. The diagram of FIG. 3 shows messages between the access device 192, the remote access server 150, the monitoring device 200, and an access control device 306 such as the keyless lock controller 162 shown in FIG. 1. It will be appreciated that other intermediary elements may be included. For the sake of clarity, these intermediaries have been omitted from FIG. 3 as well as the description thereof.

The messaging shown in FIG. 3 assumes that access was previously granted to the delivery location for unattended delivery. The delivery may be identified as complete such as by receipt of a signal from a communication device associated with the delivery device, by analysis of monitoring data, or the like by the remote access server 150. Once the delivery is identified as completed, the remote access server 150 may transmit a terminate access message 320 to the monitoring device 200 to terminate access to the delivery location. The terminate access message 320 may include an identification of devices and desired states for the devices to secure the delivery location. The device identifiers and states may be retrieved from a data store by the remote access server 150. The data store may include records associated with the delivery location which may be used to generate the terminate access message 320.

The terminate access message 320 may cause the monitoring device 200 to transmit a message 322 to the access control device 306 to secure the delivery location. For example, if the access control device 306 is a keyless lock controller, the message 322 may cause the controller to re-engage the lock. One or more confirmation messages 324 may be transmitted by the access control device 306 to the monitoring device 200 to indicate that the lock or other securing mechanism is activated. As discussed, activation of the lock or other securing mechanism is not a guarantee that the delivery location is in fact secured.

To further confirm the state of the delivery location, the monitoring device 200 may, via messaging 326, confirm that the location is secure based at least in part on detecting the surface indicium. The confirmation may include collecting sensor data such as one or more images of the delivery location. The images may be scanned for barcodes or other one-dimensional indicium. The scanning may include a pixel-by-pixel analysis of an image for a predetermined color pattern. In some implementations, the analysis may be directed, focusing on pixels within a predetermined area of the image. For example, after the monitoring device 200 is installed, a sample image may be captured by the monitoring device 200. Using the access device 192 or other communication device configured to present user interfaces, the recipient may identify an area of the sample image corresponding to the entry (e.g., door). This information may then be used to define an area in the captured image for searching for the surface indicium.

In some implementations, the messaging 326 may include retrieving reference information for the delivery location. The reference information may include a code encoded by the surface indicium. In some implementations, the reference information may include an image of the surface indicium. In some implementations, the monitoring device 200 may be activated in a configuration mode to capture and store image data or other reference information for the delivery location. The confirmation may include comparing the reference information to at least a portion of the image captured by the monitoring device 200 or information decoded therefrom (e.g., a barcode shown in the image). The messaging 326 may include capturing a set of images over a period of time. If the surface indicium is identified in a threshold number of images, then the location may be identified as unsecured.

As shown in FIG. 3, the location is determined to be unsecured. Via messaging 328, an alert of the unsecured state may be provided by the monitoring device 200. The monitoring device 200 may provide an alert by adjusting one or more features of the monitoring device 200 such as activating an audio output, activating an illuminator, or a combination thereof. In some implementations, the monitoring device 200 may provide an alert 330 to another entity such as the remote access server 150. Alternatively or in addition, the monitoring device 200 may provide an alert 332 to the access device 192. The alert 330 or the alert 332 may include static monitoring data or a stream of monitoring data captured by the monitoring device 200. In some implementations, an alert (not shown) may be provided to the delivery device of the delivery agent who requested access to the delivery location. For example, the remote access server 150 may store an identifier for the delivery agent who transmitted a request to secure the delivery location such as after completing unattended delivery of an item. Based on this historical information, the delivery agent or their delivery device may be identified and alerted. In some implementations, an alert (not shown) may be provided to a third-party identified in the recipient's profile such as a security service, local emergency responders, or a neighbor.

The access control device 306 may be secured via message 334. The securing may include manual adjustment of the access control device 306. In some implementations, the securing may include transmitting additional control signals to the access control device 306 such as from the monitoring device 200 or from the remote access server 150.

Via messaging 336, the monitoring device 200 may again confirm the security of the delivery location by attempting to detect the surface indicium. The assessment via messaging 336 may be similar to the analysis of messaging 326. However, in FIG. 3, the messaging 336 determines that the location is secure. That is, messaging 336 does not detect the surface indicium.

The monitoring device 200 may transmit a message 338 indicating that the delivery location is secured. The message 338 may include an identifier of the location or monitoring device 200 to facilitate association of the confirmation with a particular location.

Once the remote access server 150 receives confirmation that the delivery location has been secured, a deactivate access state message 338 may be transmitted to the monitoring device 200. The message 340 may cause the monitoring device 200 to terminate collection of data (e.g., video recording) at the delivery location.

The monitoring device 200 is discussed as both a sensor (e.g., camera) and a communications coordination device for exchanging messages between, for example, the access control device 306 and the remote access server 150. In some implementations, these functionalities may be separated into distinct devices. For example, a monitoring hub may be included at the delivery location and configured to coordinate messaging between the remote access server 150 and a variety of devices at the delivery location such as one or more sensors or one or more access control devices. In some implementations, the communications functions may be provided by a device coupled to the monitoring device 200. For example, a Z-WAVE® adapter may be connected to a peripheral port (e.g., Universal Serial Bus port) of the monitoring device 200. The peripheral port may provide data and power connectivity for the communication adapter (e.g., Z-WAVE® adapter).

Figure 4:
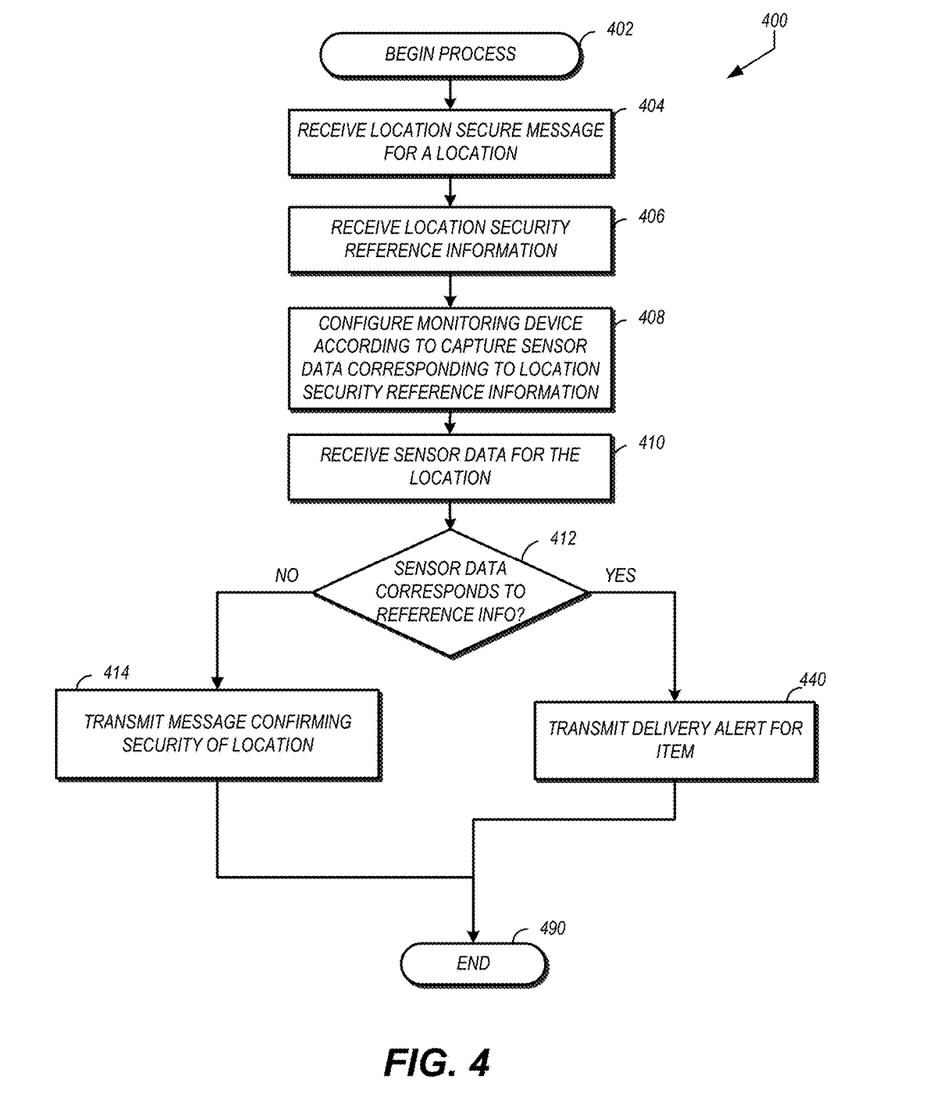
FIG. 4 is a flow diagram depicting an example method of detecting secure remote access.

FIG. 4 is a flow diagram depicting an example method of detecting secure remote access. The method 400 may be implemented in whole or in part by the devices described such as the remote access server 150 or the monitoring device 200. For clarity of explaining the method 400, the steps will be attributed to the monitoring device 200 but in other implementations, all or portions of the method 400 may be performed by or in conjunction with the remote access server 150. The method 400 illustrates how a delivery location can be assessed to determine whether the location is secured or has a malfunctioning access control device.

The method 400 may begin at block 402 with the assumption that an item has been delivered to a location. At block 404, the monitoring device 200 may receive message indicating that a location has been secured. The message may be received from an access control device such as a lock controller.

At block 406, the monitoring device 200 may receive reference information indicating the location is secured. Block 406 may include querying the remote access server 150 using an identifier for the location to receive the reference information. In some implementations, the monitoring device 200 may include a memory device that stores the reference information. The storage may be permanent or cache memory. In a cached memory system, the reference information may be stored for a predetermined period of time, after which the reference information may be removed from the cache.

The reference information may include an image of a surface indicium that, when shown in an image of the delivery location, indicates that the location is unsecured. In some implementations, the reference information may include a sequence of characters encoded by a surface indicium shown in an image of the delivery location. In such implementations, the surface indicium may be decoded and compared to the sequence of characters to determine whether the location is secured.

At block 408, the monitoring device 200 may be configured to capture sensor data that corresponds to the reference information according to one or more detection parameters. For example, if the reference information includes a sequence of characters, the monitoring device 200 may activate a barcode decoder function. This decoding function may be disabled during normal operation to preserve resources of the monitoring device 200. The configuration may include activating an illuminator to cast light of an appropriate wavelength (e.g., ultraviolet or infrared) to activate the surface indicium. The configuration may include identifying when and how much data to capture (e.g., a number of images to capture). The configuration may include directional information to adjust the field of sensing for the monitoring device 200. The directional information may cause activation of a servo or other mechanical means to move the monitoring device 200 to monitor the specified location.

At block 410, the sensor data is received by the monitoring device 200. Receiving the sensor data may be performed according to the configuration provided at block 408. In some implementations, receiving the sensor data may include transmitting the sensor data from the monitoring device 200 to the remote access server 150 for further analysis.

At block 412, the monitoring device 200 may determine whether the sensor data corresponds to the reference information. For example, the correspondence may include extracting a portion of the sensor data and comparing the pixel information to pixel information in an image included in the reference information. Correspondence may include detecting a barcode shown in the sensor data and comparing the barcode and/or data encoded thereby with the reference information.

If the determination at block 412 is affirmative (e.g., the surface indicium associated with the reference information is detected), the method 400 may proceed to block 440. At block 440, the monitoring device 200 or the remote access server 150 may transmit a delivery alert for the location. Transmitting a delivery alert may include notifying the shipper of the item. For example, a delivery alert indicating that the item was delivered but that the location was not secured may be transmitted to a monitoring service. A delivery alert may be transmitted to a delivery device. For example, if the door was inadvertently obstructed by the item or other object moved by the delivery agent 120 in error, the alert may cause the interface of the delivery device 122 to present a message indicating that the delivery agent 120 should return to clear the area and/or re-secure the delivery location. A delivery alert may be transmitted to the recipient 190. In some implementations, the transmission may be based on a value encoded by the surface indicium such as a phone number, email address, instant messenger username, or other communication identifier. The identifier may be retrieved based on the value encoded by the surface indicium such as from a profile managed by the remote access server 150. The transmission may be via a wide area network such as a cellular network, satellite network, or the Internet. Once transmitted, the method 400 may end at block 490.

Returning to block 412, if the determination that the sensor data corresponds to the reference information is negative (e.g., the surface indicium is not detected), the monitoring device 200 may transmit a message confirming security of the location to the remote access server 150. The confirmation message may include an identifier for the location, the monitoring device 200, or other information to indicate which location has been secured. In some implementations, transmitting the message may include transmitting a message to the access device 192 of the recipient 190 indicating that the delivery of an item is complete and that the location's security has been confirmed. In some implementations, the transmitting at block 412 may include transmitting a security confirmation message to the remote access server 150. The remote access server 150 may take further action upon receipt of the confirmation such as transmitting a notification to the access device of the recipient or transmitting one or more control messages to the monitoring device 200 to adjust the collection of data thereby.

For example, having confirmed the security of the location, the monitoring of the delivery location may then be adjusted to a pre-delivery configuration. The remote access server 150 may transmit one or more control messages to the monitoring devices that were activated to monitor the unattended delivery. The one or more control messages may change the monitoring state of the monitoring devices (e.g., stop recording; turn on motion activated monitoring). A control message may be transmitted via a wide area network to a specific monitoring device to be adjusted. In some implementations, the control message may be transmitted to one monitoring device for further dissemination via the local area network at the delivery location. The method 400 may end at block 490. The method 400 ensures that the unattended delivery is identified as completed when the delivery location is properly secured.

Figure 5:
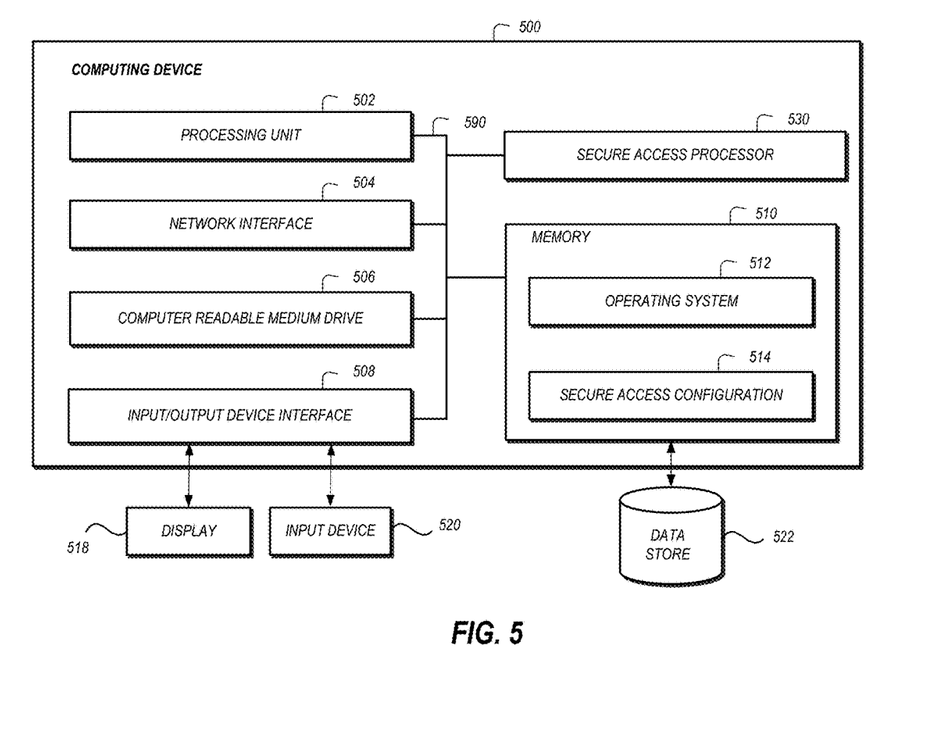
FIG. 5 is a block diagram of an illustrative computing device that may implement one or more of the location security features described.

FIG. 5 is a block diagram of an illustrative computing device that may implement one or more of the location security features described. The computing device 500 may implement the methods or messaging shown in FIG. 3 or 4. The computing device 500 can be a server or other computing device, and can comprise a processing unit 502, a secure access processor 530, a network interface 504, a computer readable medium drive 506, an input/output device interface 508, and a memory 510. The network interface 504 can provide connectivity to one or more networks or computing systems. The processing unit 502 can receive information and instructions from other computing systems or services via the network interface 504. The network interface 504 can also store data directly to memory 510. The processing unit 502 can communicate to and from memory 510 and output information to an optional display 518 via the input/output device interface 508. The input/output device interface 508 can also accept input from the optional input device 520, such as a keyboard, mouse, digital pen, microphone, mass storage device, etc.

The memory 510 contains computer program instructions that the processing unit 502 executes in order to implement one or more embodiments. The memory 510 may include RAM, ROM, and/or other persistent, non-transitory computer readable media. The memory 510 can store an operating system 512 that provides computer program instructions for use by the processing unit 502 or other elements included in the computing device in the general administration and operation of the computing device 500. The memory 510 can further include computer program instructions and other information for implementing aspects of the present disclosure.

For example, in one embodiment, the memory 510 includes a secure access configuration 514. The secure access configuration 514 may include the thresholds, security reference information, or other predetermined or configurable values described above. The secure access configuration 514 may store specific values for a given configuration. The secure access configuration 514 may, in some implementations, store information for obtaining values for a given configuration element. For example, a barcode detection service may be specified as a network location (e.g., URL) in conjunction with username and password information to access the network location to submit an image for barcode recognition. The secure access configuration 514 may be used by the secure access processor 530 to implement one or more of the aspects described herein. In some implementations, the secure access processor 530 may include specific computer executable instructions that cause the computing device 500 to perform one or more of the secure access control features described.

The memory 510 may also include or communicate with one or more auxiliary data stores, such as data store 522. The data store 522 may electronically store data regarding the item, the delivery agent, the delivery device, the delivery location, monitoring devices, access control configurations for locations or devices, location security reference information, and the like.

The elements included in the computing device 500 may be coupled by a bus 590. The bus 590 may be a data bus, communication bus, or other bus mechanism to enable the various components of the computing device 500 to exchange information.

In some embodiments, the computing device 500 may include additional or fewer components than are shown in FIG. 5. For example, a computing device 500 may include more than one processing unit 502 and computer readable medium drive 506. In another example, the computing device 502 may not be coupled to the display 518 or the input device 520. In some embodiments, two or more computing devices 500 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A secure access control device (e.g. remote access server or monitoring device) can be or include a microprocessor, but in the alternative, the secure access control device can be or include a controller, microcontroller, or state machine, combinations of the same, or the like configured to authenticate and authorize remote access for delivery of an item. A secure access control device can include electrical circuitry configured to process computer-executable instructions. Although described herein primarily with respect to digital technology, a secure access control device may also include primarily analog components. For example, some or all of the access control algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a secure access control device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the secure access control device such that the secure access control device can read information from, and write information to, the storage medium. In the alternative, the storage medium can be integral to the secure access control device. The secure access control device and the storage medium can reside in an application specific integrated circuit (ASIC). The ASIC can reside in an access device or other secure access control device. In the alternative, the secure access control device and the storage medium can reside as discrete components in an access device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method of location security detection, the computer-implemented method comprising:
    under control of one or more computing devices executing specific computer-executable instructions from a non-transitory computer-readable medium,
        receiving, from a device for securing an entry to a delivery location, a message indicating that the device is engaged to secure the delivery location;
        capturing, via an optical scanning device at the delivery location, an image of the entry to the delivery location;
        determining that the image includes at least a portion of a one dimensional barcode; and
        causing transmission of an alert to at least one communication device associated with the delivery location, the alert indicating that the delivery location is unsecured.

2. The computer-implemented method of claim 1, further comprising:
    storing, in a memory, a series of alphanumeric characters for the delivery location;
    determining a set of characters encoded by the one dimensional barcode;
    determining that the set of characters corresponds to the series of alphanumeric characters.

3. The computer-implemented method of claim 1, wherein the one dimensional barcode encodes a telephone number for the at least one communication device, and wherein causing transmission of the alert comprises transmitting the alert based at least in part on the telephone number.

4. A computer-implemented method of monitoring access to a physical location, the computer-implemented method comprising:
    under control of one or more computing devices executing specific computer-executable instructions from a non-transitory computer-readable memory,
        receiving, from an access control device, information identifying a secured state for the access control device;
        capturing, via a monitoring device at the physical location, monitoring data of the physical location;
        determining that the monitoring data includes a representation of at least a portion of a surface indicium; and transmitting, to at least one communication device, a message identifying an error state for the physical location.

5. The computer-implemented method of claim 4, wherein the monitoring data comprises image data, and wherein the surface indicium comprises a one dimensional pattern, and wherein the computer-implemented method further comprises detecting the one dimensional pattern based at least in part on pixel values included in the image data.

6. The computer-implemented method of claim 5, further comprising:

retrieving, from a memory, a reference value represented by the surface indicium for the physical location; and determining that the reference value corresponds to at least one of:
(i) the surface indicium shown in the image data; or
(ii) a value encoded by the surface indicium shown in the image data.

7. The computer-implemented method of claim 6, further comprising:

activating a configuration mode for the monitoring device;

capturing an image of the physical location, wherein the reference value comprises the image; and storing the image in the memory.

8. The computer-implemented method of claim 5, further comprising:

receiving a detection parameter for the surface indicium associated with the physical location; and adjusting the monitoring device to capture the image data based at least in part on the detection parameter.

9. The computer-implemented method of claim 8, wherein the detection parameter identifies a wavelength of light for illuminating the physical location during image capturing.

10. The computer-implemented method of claim 4, wherein the surface indicium encodes a telephone number for the at least one communication device, and wherein causing transmission of the message comprises transmitting the message based at least in part on the telephone number.

11. The computer-implemented method of claim 4, wherein the access control device comprises a lock, and wherein the information identifying the secured state comprises a locked engaged message.

12. The computer-implemented method of claim 4, further comprising receiving, from a delivery device, a request to secure the physical location, wherein the at least one communication device comprises the delivery device.

13. The computer-implemented method of claim 4, wherein the message includes monitoring data captured by the monitoring device.

14. A security system comprising:

a non-transitory computer-readable memory storing executable instructions; and one or more computer processors in communication with the computer-readable memory, wherein the one or more computer processors are configured to execute the executable instructions to at least:

receive, from an access control device at a physical location, information identifying a secured state for the access control device;

capture, via a monitoring device at the physical location, monitoring data of the physical location;

determine that the monitoring data includes a representation of at least a portion of a surface indicium; and transmit, to at least one communication device, a message identifying an error state for the physical location.

15. The security system of claim 14, wherein the monitoring data comprises image data, and wherein the surface indicium comprises a one dimensional pattern, and wherein the one or more computer processors are configured to execute the executable instructions to at least detect the one dimensional pattern based at least in part on pixel values included in the image data.

16. The security system of claim 15, wherein the one or more computer processors are configured to execute the executable instructions to at least:

retrieve, from a memory, a reference value represented by the surface indicium for the physical location; and determine that the reference value corresponds to at least one of:

the surface indicium shown in the image data; or
(ii) a value encoded by the surface indicium shown in the image data.

17. The security system of claim 14, wherein the one or more computer processors are configured to execute the executable instructions to at least:

receive an indication that the unlock was successful;

obtain a configuration for the monitoring device, wherein the configuration indicates when to initiate capture of the monitoring data, wherein the monitoring data is captured based at least in part on the configuration; and transmit an alert to at least one of: a user device associated with the physical location or the delivery device indicating a possible access failure.

18. The security system of claim 14, wherein the one or more computer processors are configured to execute the executable instructions to at least:

receive a detection parameter for the surface indicium, the detection parameter being associated with the physical location; and adjust the monitoring device to capture the monitoring data based at least in part on the detection parameter.

19. The security system of claim 14, wherein the surface indicium encodes a telephone number for the at least one communication device, and wherein causing transmission of the message comprises transmitting the message based at least in part on the telephone number.

20. The security system of claim 14, wherein the one or more computer processors are configured to execute the executable instructions to at least receive, from a delivery device, a request to secure the physical location, wherein the at least one communication device comprises the delivery device.

* * * * *